United States Patent
Bahrs et al.

(10) Patent No.: US 9,939,955 B2
(45) Date of Patent: *Apr. 10, 2018

(54) MECHANISM TO CREATE PATTERN GESTURE TRANSMISSIONS TO CREATE DEVICE-SOURCING EMERGENCY INFORMATION

(71) Applicant: INTERNATIONAL BUSINESS MACHINES CORPORATION, Armonk, NY (US)

(72) Inventors: Peter C. Bahrs, Austin, TX (US); Peter H. Burton, Burnaby (CA); Donna K. Byron, Littleton, MA (US); Sangeeta Gautam, Waltham, MA (US); Manvendra Gupta, Markham (CA); Anne Kline, Endicott, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,880

(22) Filed: Sep. 27, 2017

(65) Prior Publication Data

US 2018/0011594 A1  Jan. 11, 2018

Related U.S. Application Data

(63) Continuation of application No. 15/592,242, filed on May 11, 2017, now Pat. No. 9,811,203, which is a (Continued)

(51) Int. Cl.
G06K 9/34 (2006.01)
G06F 3/041 (2006.01)
(Continued)

(52) U.S. Cl.
CPC ......... *G06F 3/0416* (2013.01); *G06K 9/4604* (2013.01); *H04W 4/22* (2013.01);
(Continued)

(58) Field of Classification Search
CPC .... G06K 9/4604; G06K 9/00335; G06K 9/78; G08B 25/012; G08B 25/014;
(Continued)

(56) References Cited

U.S. PATENT DOCUMENTS 6,163,281 A * 12/2000 Torch .................. A61B 3/0066
                                                340/575
7,379,563 B2 * 5/2008 Shamaie ............ G06K 9/00335
                                                348/169
(Continued)

*Primary Examiner* — Stephen R Koziol
*Assistant Examiner* — Timothy Choi
(74) *Attorney, Agent, or Firm* — Shimokaji IP

(57) ABSTRACT

A system may comprise a registration device configured to register patterns for users; a recording device configured to record a received pattern, as an electronic pattern, wherein the recording device recognizes the received pattern as one of the registered patterns; a receiving device configured to observe human movement patterns with a camera, transform the observed human movement patterns to an electronic signal, and receive the recognized registered pattern from the recording device by a first wireless transmission; a forwarding device configured to transmit the electronic signal, and the received recognized registered pattern to an alert service by a second wireless transmission; and an alert service, configured to receive the electronic signal and the received recognized registered pattern from the forwarding device and configured to transmit the electronic signal and the received recognized registered pattern to a second electronic device by a third wireless transmission.

1 Claim, 2 Drawing Sheets

Related U.S. Application Data continuation of application No. 15/094,649, filed on Apr. 8, 2016, now Pat. No. 9,684,822.

(51) Int. Cl.
| | | |
|---|---|---|
| *H04W 4/22* | (2009.01) | |
| *G06K 9/46* | (2006.01) | |
| *G08B 25/08* | (2006.01) | |
| *G06K 9/00* | (2006.01) | |
| *G08B 25/10* | (2006.01) | |
| *G08B 25/01* | (2006.01) | |
| *H04W 88/02* | (2009.01) | |
| *G06K 9/78* | (2006.01) | |

(52) U.S. Cl.
CPC ........... *G06K 9/00335* (2013.01); *G06K 9/78* (2013.01); *G08B 25/012* (2013.01); *G08B 25/014* (2013.01); *G08B 25/016* (2013.01); *G08B 25/08* (2013.01); *G08B 25/10* (2013.01); *H04W 88/02* (2013.01)

(58) Field of Classification Search
CPC ...... G08B 25/016; G08B 25/08; G08B 25/10; G06F 3/0416; H04W 4/22; H04W 88/02
See application file for complete search history.

(56) References Cited

U.S. PATENT DOCUMENTS

| | | | |
|---|---|---|---|
| 8,395,510 B1* | 3/2013 | Kirk | G08B 25/08 340/539.12 |
| 8,538,374 B1* | 9/2013 | Haimo | G01S 19/17 370/259 |
| 8,983,422 B2 | 3/2015 | Park et al. | |
| 9,189,951 B2 | 11/2015 | Stephens, Jr. | |
| 2004/0097871 A1* | 5/2004 | Yerushalmy | A61N 1/36017 604/65 |
| 2008/0166992 A1* | 7/2008 | Ricordi | A61B 5/0002 455/404.2 |
| 2010/0063949 A1* | 3/2010 | Eaton | G06K 9/00335 706/14 |

* cited by examiner

US 9,939,955 B2

MECHANISM TO CREATE PATTERN GESTURE TRANSMISSIONS TO CREATE DEVICE-SOURCING EMERGENCY INFORMATION

This application is a continuation of application Ser. No. 15/592,242. Application Ser. No. 15/592,242 is a continuation of application Ser. No. 15/094,649. This application claims priority to those applications. The present invention generally relates to patterned gesture transmissions. More particularly, the present invention relates to a mechanism to create pattern gesture transmissions to create device-sourcing emergency information.

BACKGROUND OF THE INVENTION

Non-verbal gestures may be difficult to transmit.

As can be seen, there is a need for a mechanism to create pattern gesture transmissions to create device-sourcing emergency information.

SUMMARY OF THE INVENTION

In one aspect, a method comprises utilizing a computer including a computer processor to: register patterns for users using a registration circuit in the computer processor, wherein the patterns include swiping a screen of a first electronic circuit, touching a screen of the first electronic circuit, a person blinking the person's eyes, the person biting the person's teeth, and the person holding the person's breath; record a received pattern as an electronic pattern using a recording circuit in the computer processor including a video and an electronic sensor configured to record a received pattern, wherein the recording circuit recognizes the received pattern as one of the registered patterns; observe human movement patterns with a camera using a receiving circuit in the computer processor, transform the observed human movement patterns to an electronic signal, and receive the recognized registered pattern from the recording circuit by a first wireless transmission, wherein groups of the observed human movement patterns are recognized as a group pattern; transmit the electronic signal, and the received recognized registered pattern, and the received group pattern to an alert server by a second wireless transmission using a forwarding circuit in the computer processor selected and configured to transmit the electronic signal, wherein the forwarding circuit is selected based on proximity to the recording circuit and the receiving circuit; and receive the electronic signal and the received recognized registered pattern and group pattern from the forwarding circuit, and transmit the electronic signal and the received recognized registered pattern to a second electronic circuit in the computer processor by a third wireless transmission.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a system and method for creating pattern gesture transmissions to create device-sourcing emergency information.

Figure 1:
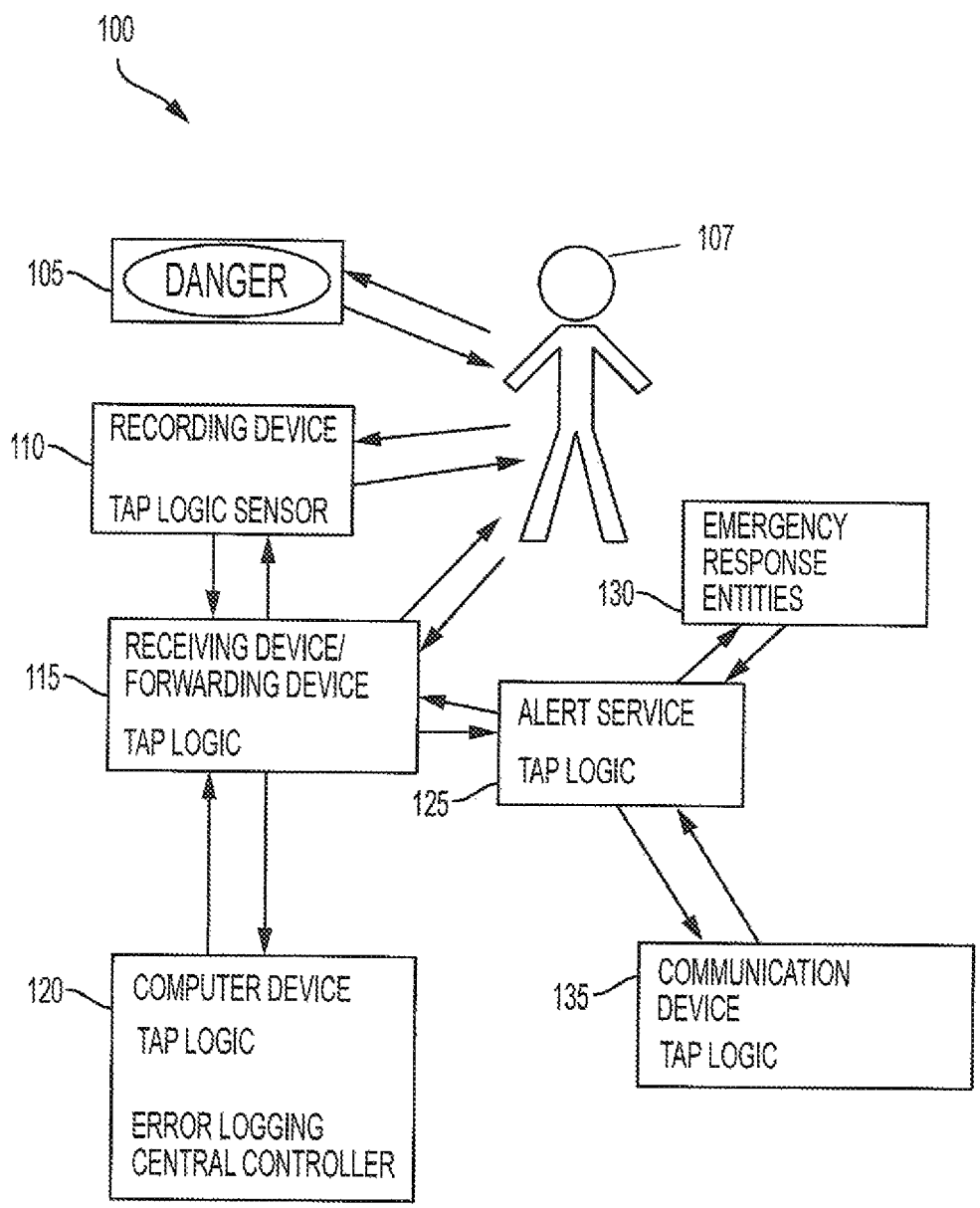
FIG. 1 illustrates a system to create pattern gesture transmissions to create device-sourcing emergency information.

In FIG. 1 a system 100 may include a computer device 120 that may serve as a registration device configured to register patterns for users, wherein the patterns include swiping a screen of a first electronic device, touching a screen of the first electronic device, a person blinking the person's eyes, the person biting the person's teeth, and the person holding the person's breath. Other examples of patterns of users that may be registered include a tap-tap-tap pattern on a smartphone, a biting pattern via a "smart filing/tooth", or a blinking pattern using "smart glasses", or a pattern using an exercise monitor. In an embodiment, in an emergency situation when a user 107 observes a danger 105, it may not be feasible for a person to ask for help verbally, or to reach for a device, such as a smartphone to call 911. Doing so may increase the danger the person is already in if the user 107 observes the danger 105. The system 100 may also be used in non-emergency situations. In this situation, the invention may allow a set of pre-defined patterns to be set up, and invoked by the user, ideally inn a stealth mode, so that the user can invoke a call for assistance, which can be broadcast across a "device crowding" emergency notification system. The computer device 120 may also perform error logging of errors received any component in the system 100. In an embodiment, the computer device 120 may also serve as a central controller to turn on or off components of the system 100.

The system 100 may include a recording device 110 including a video and an electronic sensor configured to record a received pattern, as an electronic pattern, wherein the recording device 110 recognizes the received pattern as one of the registered patterns. The registered patterns may be in, for example, "Tap Logic", in which taps by the user 107 in a specific pattern may be recognized as one of the registered patterns.

The system 100 may include a receiving/forwarding device 115 configured to observe human movement patterns with a camera, transform the observed human movement patterns to an electronic signal, and receive the recognized registered pattern from the recording device 110 by a first wireless transmission.

The receiving/forwarding device 115 may be configured to transmit the electronic signal, and the received recognized registered pattern to an alert service 125 by a second wireless transmission. The system 100 may include the alert service 125, configured to receive the electronic signal and the received recognized registered pattern from the receiving/forwarding device 115 and configured to transmit the electronic signal and the received recognized registered pattern to emergency response entities 130, and also to a second electronic device such as a communication device 135 by a third wireless transmission.

Figure 2:
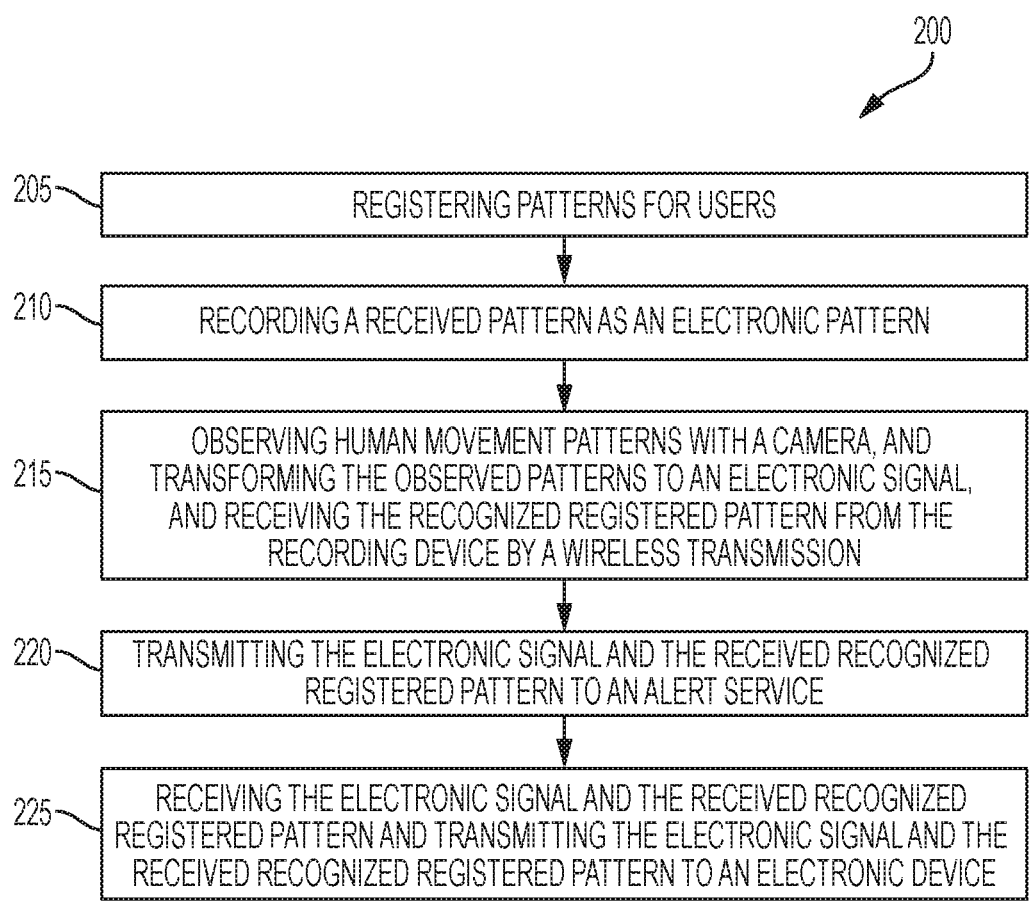
FIG. 2 illustrates a method for creating pattern gesture transmissions to create device-sourcing emergency information.

In FIG. 2 a method 200 may include a step 205 of registering patterns for users. A step 210 may include recording a received pattern as an electronic pattern. A step 215 may include observing human movement patterns with a camera, and transforming the observed patterns to an electronic signal, and receiving the recognized registered pattern from the recording device by a wireless transmission. A step 220 may include transmitting the electronic signal and the received recognized registered pattern to an alert service. A step 225 may include receiving the electronic signal and the received recognized registered pattern and transmitting the electronic signal and the received recognized registered pattern to an electronic device.

In an embodiment, a device may contain an application or firmware, or logic to respond to a "tap tap tap" emergency protocol. An emergency network may be created to ensure that a "tap tap tap" signal is broadcast until an emergency is resolved. A tap may, for example, be a movement or gesture such as swiping a screen, touching a screen, blinking a person's eyes, biting a person's teeth, or holding a person's breath. The tap may be a non verbal or audio gesture that can be recorded by a sensor or device and transmitted according to specified rules.

In an embodiment, a user's smart phone may be locked. The smart phone may be enabled with firmware or an application. The user may be in an emergency situation and may tap glass on the face of the smartphone with a pre-recorded pattern. For example, "SOS" may be three short taps, three long taps, and another three short taps. A message and message context may be transmitted to any connected device. The connected device may receive the message and message context and re-transmit the message and message context. Registered participants may receive localized emergency alerts from a neighbor or co-worker.

In an embodiment, a user may be a person during an emergency situation. The person may have a smart tooth filling and the person may bite a non-perceivable set of bites in a pre-defined pattern. The pattern may be transmitted to participating devices. A participating device may be smart eyeglasses by a bank manager. A co-worker may have smart glasses, also observe the emergency situation, and may issue that co-worker's pattern by blinking a pattern. The person's pattern and the co-worker's pattern may be forwarded to wireless devices, or to a motion detector camera. In an embodiment, audio outside of between 20 and 20,000 cycles per second may be forwarded to the wireless devices.

In an embodiment, users may register a pattern for the user to use for transmission of emergency situations. An encoding set of rules may be used to create patterns for the users. An application on an electronic device may calibrate gestures for one of the users for a specified type of electronic device. The application may recognize gestures and invoke rules to transmit gestures to electronic devices. Transmission of the gestures to electronic devices may be dependent on time and proximity of the electronic devices to the source of the gesture or proximity to the device transmitting the gesture. The transmitting device and receiving devices may log errors and transmit the errors to a computer server for analysis.

In an embodiment, the non-verbal gestures may be recognized as a pattern by a receiving electronic device. Groups of the non-verbal gestures may be recognized as a group pattern. A specified action may be specified and invoked by one of the electronic devices for each pattern or group pattern. A dynamic ad-hoc network of electronic devices may be dynamically created based on proximity of electronic devices to each other, and based on proximity of the electronic devices to a source of the pattern or group pattern. This dynamic ad-hoc network of electronic devices may form an emergency channel.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for registering patterns for users, the computer program product comprising a computer readable storage device having program instructions embodied therewith, the program instructions executable by a computer to cause the computer to:

register patterns for users using a registration circuit in the computer processor, wherein the patterns include swiping a screen of a first electronic circuit, touching a screen of the first electronic circuit, a person blinking the person's eyes, the person biting the person's teeth, and the person holding the person's breath;

record a received pattern as an electronic pattern using a recording circuit in the computer processor including a video and an electronic sensor configured to record a received pattern, wherein the recording circuit recognizes the received pattern as one of the registered patterns;

observe human movement patterns with a camera using a receiving circuit in the computer processor, transform the observed human movement patterns to an electronic signal, and receive the recognized registered pattern from the recording circuit by a first wireless transmission, wherein groups of the observed human movement patterns are recognized as a group pattern;

transmit the electronic signal, and the received recognized registered pattern, and the received group pattern to an alert server by a second wireless transmission using a forwarding circuit in the computer processor selected and configured to transmit the electronic signal, wherein the forwarding circuit is selected based on proximity to the recording circuit and the receiving circuit; and receive the electronic signal and the received recognized registered pattern and group pattern from the forwarding circuit, and transmit the electronic signal and the received recognized registered pattern to a second electronic circuit in the computer processor by a third wireless transmission.

* * * * *